(12) United States Patent
Dibella et al.

(10) Patent No.: US 7,613,846 B2
(45) Date of Patent: *Nov. 3, 2009

(54) SYSTEM FOR GENERATING A DATA LOGOUT IN A COMPUTING ENVIRONMENT

(75) Inventors: Leonard J. Dibella, Lake Kalrine, NY (US); Patricia G. Driever, Poughkeepsie, NY (US); John R. Flanagan, Poughkeepsie, NY (US); Dennis L. Massey, Poughkeepsie, NY (US); William H. Miller, Newburgh, NY (US); Louis W. Ricci, Hyde Park, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/847,621

(22) Filed: Aug. 30, 2007

(65) Prior Publication Data

US 2009/0063713 A1    Mar. 5, 2009

(51) Int. Cl.
*G06F 3/00*    (2006.01)
(52) U.S. Cl. .......................... 710/19; 710/15
(58) Field of Classification Search ................... 710/15, 710/19
See application file for complete search history.

(56) References Cited

U.S. PATENT DOCUMENTS

| 6,671,740 | B1 | 12/2003 | Driever et al. |
| 6,687,853 | B1 | 2/2004 | Driever et al. |
| 6,728,772 | B1 | 4/2004 | Driever et al. |
| 6,829,659 | B2 | 12/2004 | Beardsley et al. |
| 6,859,439 | B1 | 2/2005 | Driever et al. |
| 7,039,693 | B2 | 5/2006 | Driever et al. |
| 7,222,179 | B2 | 5/2007 | Srivastava et al. |
| 2004/0054785 | A1 | 3/2004 | Driever et al. |
| 2004/0193968 | A1 | 9/2004 | Dugan et al. |
| 2008/0072103 | A1* | 3/2008 | Lou ........................... 714/38 |

* cited by examiner

*Primary Examiner*—Alford W Kindred
*Assistant Examiner*—David E Martinez
(74) *Attorney, Agent, or Firm*—Scully, Scott, Murphy & Presser, P.C.; John E. Campbell

(57) ABSTRACT

A method and system are disclosed for generating a data logout in a computing environment having a processor and an input/output subsystem for receiving data from and sending data to the processor. The method comprises the steps of the input/output subsystem maintaining a defined set of data; at defined time, the processor issuing a data logout command; and sending said data logout command to the input/output subsystem. In response to receiving said data logout command, the input/output subsystem sends said defined set of data to a specified location. In a preferred implementation, the input/output subsystem includes a channel subsystem and a plurality of input/output devices, and the data logout command is sent to one of the input/output devices. Also, in the preferred embodiment, the channel subsystem includes a channel control unit function and the data logout command is sent to the channel control unit function.

20 Claims, 3 Drawing Sheets

SYSTEM FOR GENERATING A DATA LOGOUT IN A COMPUTING ENVIRONMENT

CROSS-REFERENCE TO RELATED APPLICATION

The present application relates to commonly-owned, co-pending U.S. patent application Ser. No. (POU920070141US2 (21254-2)), for "METHOD FOR GENERATING A DATA LOGOUT IN A COMPUTING ENVIRONMENT" filed concurrently with this application, the whole contents and disclosure of which is expressly incorporated by reference herein as it fully set forth herein.

BACKGROUND OF THE INVENTION

1. Field of the Invention

This invention generally relates to computing environments, and more specifically, the invention relates to data logout procedures in computing environments. Even more specifically, the preferred embodiment of the invention relates to a method and system well suited for generating a data logout command across a channel-to-channel connection in a computing environment.

2. Background Art

Channel-to-channel (CTC) adapters have been used for many years as a general-purpose communication mechanism between computer systems. For example, CTC adapters have been the principle mechanism for connecting multiple S/390 system and zSeries (offered by International Business Machines Corporation of Armonk, N.Y.) hosts together in homogeneous environments. S/390 and zSeries hosts can also be connected to other heterogeneous environments, such as IBM's RS/6000 and/or AS/400 systems. The CTC adapter is independent of the end users protocol, and has wide application in areas such as coupling of multiprocessor systems as well as in traditional communications protocol stacks (e.g., TCP/IP, SNA).

The CTC adapter provides a CTC control unit (CU) function within a channel residing in a channel subsystem. The CTC CU function provides control of CTC I/O devices. I/O device types include such components as peripheral cache memories, data storage units such as direct access storage devices (DASD), printers, tape recorders, and the like. From a programming viewpoint, control of a CTC I/O device is accomplished through a logical device (simply "device" hereinafter), each residing in a channel subsystem and associated with a CTC CU function.

When an I/O device is controlled through commands passing from a channel in one channel subsystem to a channel in another channel subsystem via a CTC CU function, the link between the channels is a CTC connection (or channel path) comprising one or more logical paths. When a system first becomes operational, typically at least one logical path is established and one or more CTC connections are initialized, thus allowing I/O commands to control devices.

One widely used channel-to-channel connection is the IBM Fiber connection, known more commonly as FICON, which provides high speed links used for attaching, for example, s/390 control units to s/390 systems, allowing interconnection of input/output (I/O) devices and host systems that are separated by tens of kilometers. For example, FICON may be used with the IBM Enterprise Storage Server, FICON is based on the industry-standard Fibre Channel architecture; consequently, the two have much in common. FICON is described in detail by C. M. DeCusatis, et al., in "Fiber optic interconnects for the IBM S/390 Parallel Enterprise Server G5," IBM Journal of Research and Development, Vol. 43, No. 5/6 (September/November 1999), pp. 807 828, IBM, FICON, IBM Enterprise Storage Server, and S/390 are trademarks of the International Business Machines Corporation, Armonk, N.Y.

FICON supports several topologies, including point-to-point and switched. In a switched topology, one link is connected from a FICON channel to a port on a switch, and another link is connected from a port on a FICON control unit to port on the same switch. Typically, switched topology is used to connect two or more hosts to two or more control units such as I/O devices.

FICON has proven to be a very successful and is widely used. It is nonetheless believed that FICON can be improved. For instance, it may be difficult to debug FICON channel-to-channel (FCTC) devices because two channels are involved in a single operation, and it is possible for the FCTC control unit functionality for the operation to be on either of the involved channels. The channel that possesses the control unit functionality is where decisions are made relative to what the active state is and how commands are answered. Logging the state of the channel with the CU function is advantageous to more expeditious debug of FCTC problems. While a mechanism exists (although, not yet exploited by z/OS) to force a non-disruptive channel log on the local channel via a CHSC instruction, no such means exists to signal the attached channel to log out if the FCTC control unit function is across a physical link.

SUMMARY OF THE INVENTION

An object of this invention is to improve data logout procedures in computing environments.

Another object of the present invention is to provide a procedure for logging data out from the channels of a channel-to-channel connection in a computing environment.

A further object of the invention is to signal across the link, of a channel-to-channel connection, to the remote channel to create a logout.

These and other objectives are attained with a method and system for generating a data logout in a computing environment having a processor and an input/output subsystem for receiving data from and sending data to the processor. The method comprises the steps of the input/output subsystem maintaining a defined set of data; at defined time, the processor issuing a data logout command; and sending said data, logout command to the input/output subsystem. In response to receiving said data logout command, the input/output subsystem sends said defined set of data to a specified location.

In a preferred implementation, the input/output subsystem includes a channel subsystem and a plurality of input/output devices, and the step of sending the data logout command to the input/output subsystem include the step of sending the data logout command to one of the input/output devices. The input/output devices may be embedded in the channel subsystem; however, the present invention can also be used with input/output devices that are not embedded in the channel subsystem. Also, in this preferred implementation, said defined set of data describes the states of one or more of said input/output devices. In addition, in the preferred embodiment, the channel subsystem includes a channel control unit function for controlling the operation of said input/output devices; and the step of sending the data logout command to the input/output subsystem further includes the step of sending the data logout command to the channel control unit function.

Also, in the preferred embodiment, the step of the processor issuing the data logout command includes the step of the operating system of the processor issuing said data logout command. Further, in a preferred embodiment, the processor receives an error indication, and the processor analyzes this error indication and issues the data logout command if the error indication meets one or more predetermined conditions.

The preferred embodiment of the invention is well suited for use in a computing environment having channel-to-channel connections, where the channeling subsystem includes a first channel local to the processor and a second channel remote from the processor. In this preferred embodiment, regardless of which of these channels the channel control unit function is on, the invention effectively logs out the desired data in response to the data logout command.

The preferred embodiment of the invention, described below in detail, provides a new FICON CTC supported 'sense-type' command, that will cause the FCTC control unit host channel to take a non-disruptive log, regardless of whether dial control unit function resides on the local channel or across a physical link. The command will be invoked out of the FCTC device ERP whenever a diagnostic bit has been set via a DIAGxx PARMLIB member under the control of Product Engineering or Level 2 service. This allows a hardware error log to be obtained at the instant software detects an unusual condition and enters its error recovery procedure and from whichever channel the FCTC control unit function decision-making is occurring on. This hardware error log may be used to help correlate the channel hardware perspective at the time of the error with the software data logged an EREP.

Further benefits and advantages of the present invention will become apparent from a consideration of the following detailed description, given with reference to the accompanying drawings, which specify and show preferred embodiments of the invention.

DETAILED DESCRIPTION OF THE PREFERRED EMBODIMENTS

The preferred embodiment of the present invention provides a way of issuing a non-disruptive logout command across the link between channels of a channel-to-channel connection in a computing environment. The invention may be employed in a computing environment based on, for example, one or more zSeries 900 computers offered by International Business Machines Corporation, Armonk, N.Y. CTC connections in a zSeries 900 environment are described in an IBM publication entitled "ESCON and FICON Channel-to-Channel Reference," IBM Publication No. SB10-7034-01, Second Edition, October 2001, which is hereby incorporated herein by reference in its entirety. Further, the computing environment may include, for instances, at least one processor or central electronic complex (CEC) having one or more logical partitions and one or more channels.

Figure 1:
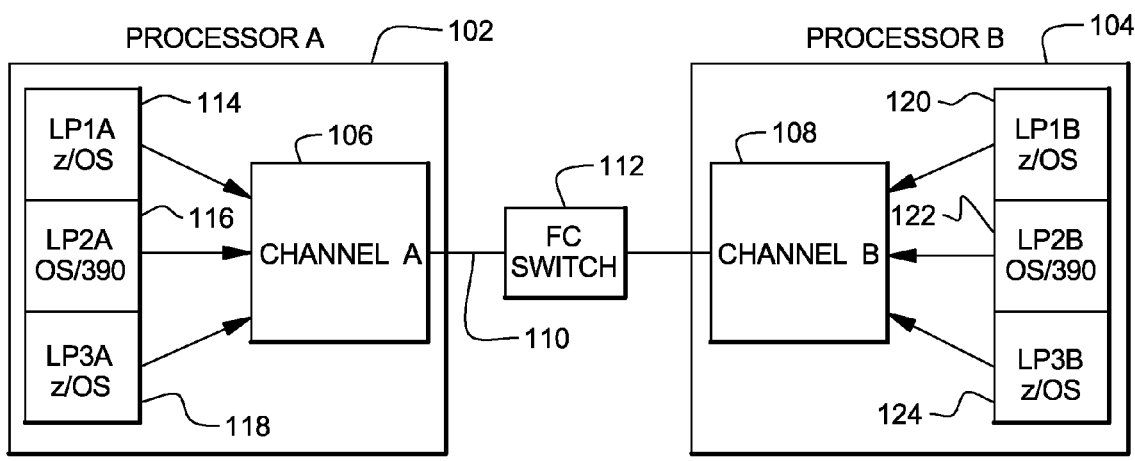
FIG. 1 is a block diagram of a computing environment wherein two channels are linked by a channel-to-channel connection and in which the present invention is practiced.

By way of example, FIG. 1 depicts one embodiment of a computing environment 100 having a processor A 102 and a processor B 104, which includes a channel A 106 and a channel B 108, respectively. A logical path is established over physical link 110 (hereinafter, simply logical path 110) that links channel A 106 and channel B 108 via fibre channel (FC) switch 112. Via communication links, channel A is shared by logical partitions LP1A 114, LP2A 116 and LP3A 118. Similarly, logical partitions LP1B 120, LP2B 122, LP3B 124 share channel B. Alternatively, channel A and/or channel B could be unshared, in which case only one logical partition would have a link to the channel.

Figure 2:
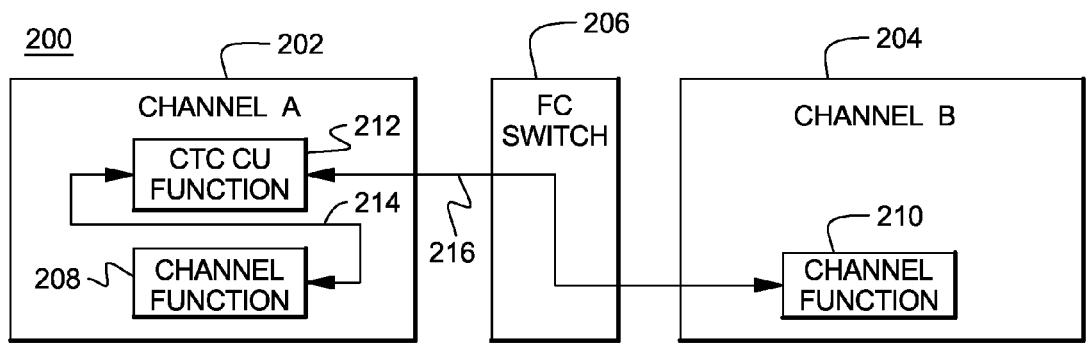
FIG. 2 is a block diagram showing in more detail the logical paths between the channels shown in FIG. 1.

A more detailed embodiment of the channels within a computing environment, generally denoted 200, is depicted in FIG. 2, wherein a first computing system has a first channel 202 and a second computing system has a second channel 204 which are linked via a FC switch 206. Each channel includes a channel function 208, 210 and channel 202 includes an integrated CTC CU function 212. CTC CU function 212 comprises a control unit, which coordinates communication between the channel functions within the different channels. The CTC CU function is described in the IBM publication entitled "ESCON and FICON Channel-to-Channel Reference," IBM Publication No. SB10-7034-01, Second Edition, October 2001.

In FICON architecture, device level communication between a channel and a control unit requires that a logical path be established between them. In the case of CTC communication, two channels each talk to & two-sided CTC control unit; therefore two logical paths are required for a complete CTC connection. A local logical path is established across an internal link between the channel function and the CTC function, on the same channel. This path 214 is shown internal to channel A in FIG. 2. The remote logical path is established across the Fibre Channel link. This path 216 is shown connecting the two channels through PC switch 206 in FIG. 2.

Both channels 202, 204 have the capability to include an integrated CTC CU function and can be, for instance, FICON channels offered by International Business Machines Corporation. In environments such as the FICON computing environment shown in FIG. 2, the CTC CU function can switch from one channel to the other. This novel switching capability is described un U.S. Pat. No. 6,728,772 entitled "Automatic Configuration of a Channel-to-Channel Connection Employing Channel-to-Channel Functioning Integrated Within One or More Channels of a Computing Environment". This switching of the CTC CU function can occur after various events, including a re-initialization of the CTC connection. When the CTC connection is initialised, or re-initialized, a load-balancing algorithm determines which end of the connection will provide the CTC CU function. The load-balancing algorithm, is described in the above-mentioned U.S. Pat. No. 6,728,772.

In system 100, the processors send data to and receive data, from an input/output system. The input/output system includes a channel subsystem and a plurality of input/output devices. Those input/output devices may be embedded in the channel subsystem; however, this invention can be used with input/output devices that are not embedded in the channel subsystem.

When an error or fault condition is detected in or in the operation of the channel-to-channel connection, the states or conditions of various devices are recorded, and this recording is referred to as a snapshot. These conditions form a log, and these conditions or states may be reported to the operating system of one of the processors, a procedure referred to as logging out or a log out. These logs may then be analyzed by the operating system to determine and to correct the condition that caused the error. The logs may be used for other purposes as well, including statistical analysis.

In the operation of the channel-to-channel connections, in the absence of a hardware detected error or fault condition, it can be difficult to isolate a FICON channel-to-channel (FCTC) problem to the application or the firmware used with the channels. This is due, in part, to the fact that firmware errors often, surface as software detected conditions. If this happens, no channel log is taken, since firmware is unaware of its fault. This makes debugging of application-detected errors difficult and time-consuming. Manual initiation of a log from the SE panel can be done, hut this is slow and can, at best, occur seconds after the error has become apparent to the operator.

The FCTC Control Unit (CU) function may he resident on the channel at the other end of the fiber link from where an error is detected. However, the channel that possesses CU functionality is where decisions are made regarding how to answer commands based on the state of the device. This CU functionality can be resident in the local channel or a channel across a physical link, and potentially in a different physical system. The preferred embodiment of the present invention provides a real-time mechanism to signal across the link to the remote channel to create a logout.

More specifically, the preferred embodiment of the invention provides a debug command that can be used to signal firmware immediately upon detection of an error condition in software. This debug command can be issued directly out of the error recovery process (ERP) of the operating system of one of the processors 102, 104 to cause a non-disruptive log to be taken by the channel in which the FCTC CU functionality resides. The use of this debug command can be limited to control of the service team, or for specific error conditions in order to avoid excessive logouts.

For example, a returned one-byte of data can be used to correlate channel logs with a software I/O trace to identify instances when multiple logs are initiated. An additional mechanism that can allow for obtaining a log from the remote channel with the FCTC function is resident on the channel local to where the command was issued.

The debug command can be issued by the operating system of either processor 102, 104 upon detection of an error condition in software, and the debug command causes a non-disruptive channel log to be taken while not altering the existing states of the devices. Any resetting event condition instructions, if existing, remain pending. Also, preferably, any previously owed status is not presented in response to the debug command. The debug command executes successfully (CE/DE status) regardless of such state, and requires only that paths be established to the FCTC device.

Preferably, the debug command is used prior to normal processing of the detected error since the device state is preserved across execution of the command. Further, preferably, the debug command is a "sense" type command, and the command returns a single byte sequence number that can be used for correlation of channel logs with software GTF traces.

Figure 3:
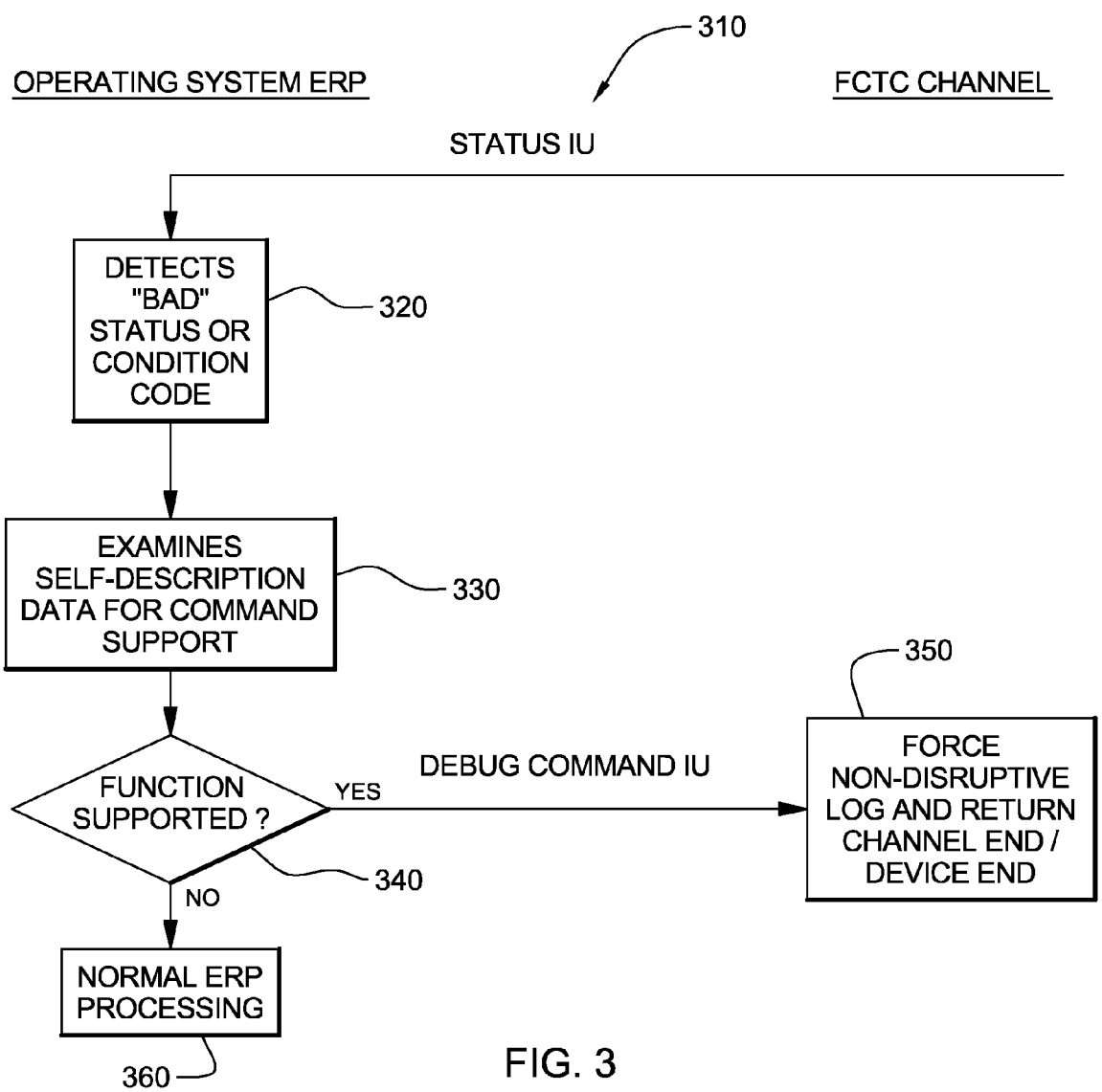
FIG. 3 shows the implementation of a channel-to-channel debug command in accordance with a preferred embodiment of the present invention.

FIG. 3 outlines a procedure for implementing an embodiment of the present invention. At step 310, a status information unit (IU) is sent from, one of the channels of the channel-to-channel connection to the ERP of the operating system of one of the processors 102, 104. At step 320, that ERP determines whether the status information unit is bad or has a specified condition code. The ERP also, at step 330, examines self-description data in, the status IU; and at step 340, the ERP determines if the debug command is supported by the operating system.

If this function is supported, then the debug command is sent to the FCTC channel that sent the status IU. This command, at step 350, forces a non-disruptive log—that is, a record of the states of various, specified devices is sent to the operating system. Also, at step 350, channel end and device end signals are returned to the operating system ERP. If, at step 340, the debug command is not supported by the operating system, then at step 360, the error condition identified in the Status IU sent to the ERP at step 310 is processed using the normal ERP procedure.

Figure 4:
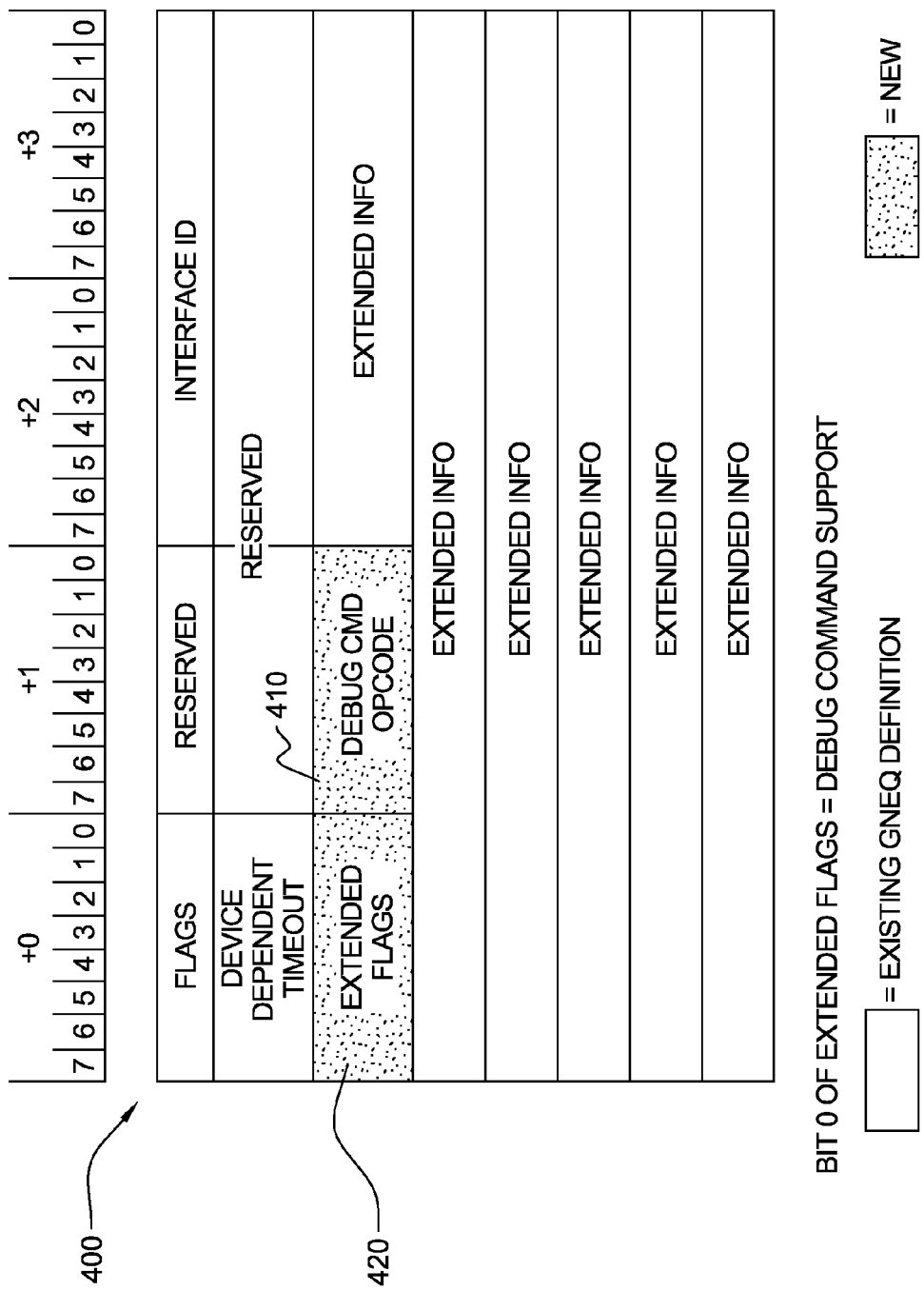
FIG. 4 shows a General Node Element Qualifier modified to include a diagnostic command in accordance with a preferred embodiment of this invention.

FIG. 4 shows a General Node Element Qualifier (GNEQ) 400 that, in the preferred embodiment of the invention, stores the debug command 410. Support for this diagnostic command as indicated in the self-description data, in word 2 of the GNEQ. This word, previously, was a reserved model-dependent area. A flag bit, stored at 420, indicates that command support is provided along with the one-byte op-code of the command.

In addition, preferably, the debug command of the present invention provides interoperability. A new debug command issued to a channel that does not support the command, results in a unit check-sense data equal command reject.

The present invention results in logging across the link between connected channels. As mentioned above, the FCTC function can reside on the channel local to where the command is issued or across a physical link, to a remote channel. When the debug command is received by the FCTC function that resides locally to the channel that issued the command, the FCTC function will cause an error condition to occur on the physical interface to the remote channel, and this will, in turn, cause that remote channel to log out as well. For example, the FCTC function may generate a link error by sending an unsolicited status frame with bad LRC. This prevents association of the link error with a specific device and generates an IFCC log, which by design docs not "call home" for service action.

An additional aspect of this invention is the method by which the 'processor' (actually the operating system running on the processor) discovers the command code to use when the debug, or logout, command is sent to the device. During initialization, the processor gathers 'self description' data from all the I/O devices in the processor's configuration. This data contains relevant characteristics for each device, such as the device's serial number, plant of manufacture, etc. Part of the self-description data gathered during this process is the GNEQ described above and shown in FIG. 4. For this aspect of the invention, a debug command code field and a validity bit are added to the GNEQ.

When, daring normal operation, the operating system of the processor got initiative to generate a logout for a particular device, that operating system would look up the command code in the saved GNEQ for that device, and use that command code to build and send the debug command to the device. This way, any given device can pick whatever command code the device wanted to assign for this purpose, rather than dictating a specific code which must be used by all devices. This is much more flexible, since for example, an unused command code which might be picked for CTC might already be assigned to another function in other device types such as disk or tape.

Although various embodiments are described above, these are only examples. Processing environments other than those described herein, can incorporate and use one or more aspects of the present invention. Further, although various control blocks have been shown, the location of the information within those control blocks may be other than shown herein. Further, each control block may include additional, less or different information than described herein. For instance, there may be additional, fewer and/or different fields, including fields that may include additional, fewer and/or different flags. Further, there may be additional, fewer and/or different field sizes. Yet further, although main memory may be used in various portions of the embodiment, one or more aspects of the present invention may be applicable to other memory. Still further, although communications protocols, such as FICON and FCP, are described herein, one or more aspects of the present invention are applicable to other protocols.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual, instruction or operation.

In yet other examples, TCW channel programs performing other commands may include one or more aspects of the present invention. Further, TCW channel programs can read other amounts of date than described herein and still benefit from one or more aspects of the present invention. Numerous other examples and modifications are possible without departing from the spirit of the present invention.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may he performed in a differing order, or steps may be added, deleted, or modified. All of these variations ate considered a part of tire claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for generating a data logout in a computing environment, comprising:
   an input/output subsystem for maintaining a defined set of data; and
   a processor for issuing a data logout command at defined times, and for sending said data logout command to the input/output subsystem; and
   wherein the input/output subsystem is configured to send said defined set of data to a specified location in response to the input/output subsystem receiving said data logout command; and wherein:
   the input/output subsystem includes a channel subsystem including a first channel and a second channel, and a channel control function on the first channel;
   the channel control function is configured to receive the data logout command;
   the channel control function is configured to send a specified command to the second channel in response to the channel control function receiving the data logout command; and
   said second channel is configured to send a subset of the defined set of data to the specified location in response to the second channel receiving said specified command.

2. A system according to claim 1, wherein:
   the input/output subsystem further includes a plurality of input/output devices; and
   the processor is configured to send the data logout command to one of the input/output devices.

3. A system according to claim 2, wherein:
   the control unit function is configured to control the operation of said input/output devices; and
   the processor is configured to send the data logout command to the channel control unit function.

4. A system according to claim 1, wherein:
   the processor includes an input receiving an error indication; and
   the processor is configured to analyze said error indication, and to issue the data logout command if the error indication meets one or more predetermined conditions.

5. A system according to claim 4, wherein the processor is configured to invoke a defined error recovery procedure at given times after the processor receives said error indication and after the processor issues the data logout command.

6. A system according to claim 5, wherein the input/output subsystem is configured to send said defined set of data to the processor.

7. A system according to claim 5, wherein the processor is configured to invoke error recovery procedure after the processor receives said defined set of data.

8. A system according to claim 1, wherein:
the input/output subsystem is configured for receiving data from and for sending data to the processor;
the input/output subsystem includes a plurality of input/output devices; and
the processor is configured (i) to gather from each of the input/output devices self-description data describing said each of said input/output devices, (ii) to generate, at defined times, the data logout command for a specified one of the input/output devices, by using the self descriptive data gathered from said specified one of the input/output devices to build the logout command, and (iii) to send the data logout command to said input/output subsystem to produce a data logout from said specified one of the input/output devices.

9. A system according to claim 8, wherein each of the input/output devices has an associated data logout command, and wherein:
the processor is configured to gather the associated data logout commands from all of the input/output devices.

10. A system according to claim 9, wherein the processor is configured to generate for the specified one of the input/output devices the data logout command associated with said specified one of the input/output device.

11. A system according to claim 10, wherein:
the processor is configured to receive an error indication to the processor; and
the processor is configured to use said error indication to identify the specified one of the input/output devices.

12. A system according to claim 11, wherein the processor is configured to generate the data logout command if said error indication meets predetermined criteria.

13. A system for generating a data logout in a computing environment, comprising:
an input/output subsystem maintaining a defined set of data; and
a processor issuing a data logout command at defined times, and for sending said data logout command to the input/output subsystem; and
wherein the input/output subsystem sends said defined set of data to a specified location in response to the input/output subsystem receiving said data logout command;
wherein the input/output subsystem includes a channel subsystem and a plurality of input/output devices, and the channel subsystem includes a first channel local to the processor, and a second channel remote from the processor, and wherein the input/output system:
maintains a first subset of the defined set of data on the first channel;
maintains a second subset of the defined set of data; on the second channel; and
sends the first and second subsets of the defined set of data to the specified location.

14. A system according to claim 13, wherein the first and second channels are connected together by a channel interface, the first channel causes an error condition of said interface, and the second channel sends said second subset of the defined set of data to the specified location in response to said error condition.

15. A computer program product for generating a data logout in a computing environment having a processor and an input/output subsystem for receiving data from and sending data to the processor, the computer program product comprising:
a storage medium readable by a processing circuit and storing tangible instructions for execution by the processing circuit for performing a method comprising:
maintaining a defined set of data on the input/output subsystem;
issuing a data logout command from the processor at defined times, and for sending said data logout command to the input/output subsystem; and
sending said defined set of data to a specified location in response to the input/output subsystem receiving said data logout command; and wherein:
the input/output subsystem includes a channel subsystem including a first channel and a second channel, and a channel control function on the first channel;
the data logout command is sent to the channel control function and in response to receiving the data logout command, the channel control function sends a specified command to the second channel; and
in response to receiving said specified command, said second channel sends a subset of the defined set of data to the specified location.

16. A computer program product according to claim 15, wherein:
the input/output subsystem further includes a plurality of input/output devices; and
the sending step includes the step of sending the data logout command to one of the input/output devices.

17. A computer program product according to claim 16, wherein:
the channel control unit function controls the operation of said input/output devices; and
the sending step includes the step of sending the data logout command to the channel control unit function.

18. A computer program product according to claim 15, wherein at times the processor receives an error indication, and the issuing step includes the steps of:
analyzing said error indication, and
issuing the data logout command if the error indication meets one or more predetermined conditions.

19. A computer program product according to claim 15, comprising the further step of invoking a defined error recovery procedure at given times after the processor receives said error indication, and after the step of issuing said the data logout command.

20. A computer program product according to claim 15, wherein the input/output subsystem further includes a plurality of input/output devices, and the first channel is local to the processor, and the second channel is remote from the processor, and wherein:
the maintaining step includes the steps of maintaining a first subset of the defined set of data on the first channel, and maintaining a second subset of the defined set of data on the second channel; and
the sending step includes the step of sending the first and second subsets of the defined set of data to the specified location.

* * * * *